United States Patent
Emmert

[11] Patent Number: 5,923,007
[45] Date of Patent: Jul. 13, 1999

[54] SWITCH ASSEMBLY INCLUDING ROCKER SWITCH WITH INTEGRATED CENTER SELECTOR SWITCH

[75] Inventor: Steven C. Emmert, Crystal Lake, Ill.

[73] Assignee: Motorola, Inc., Schaumburg, Ill.

[21] Appl. No.: 08/950,955

[22] Filed: Oct. 15, 1997

[51] Int. Cl.⁶ .................................................. H01H 9/26
[52] U.S. Cl. ............................ 200/5 R; 200/5 A; 200/339
[58] Field of Search ................................ 200/5 R, 292, 200/293, 5 A, 6 A, 339; 318/286

[56] References Cited

U.S. PATENT DOCUMENTS

| | | | |
|---|---|---|---|
| 3,703,613 | 11/1972 | Abel | 200/11 |
| 3,952,176 | 4/1976 | Holder et al. | 200/11 |
| 4,120,044 | 10/1978 | Harayda | 264/900 |
| 4,310,729 | 1/1982 | Resener | 179/90 |
| 4,331,853 | 5/1982 | Ireland | 200/330 |
| 4,654,488 | 3/1987 | Westfall | 200/5 |
| 4,769,516 | 9/1988 | Allen | 200/5 |
| 4,857,678 | 8/1989 | Lipp | 200/16 |
| 4,947,461 | 8/1990 | Yoshioka et al. | 200/5 R |
| 4,972,051 | 11/1990 | Hodsdon | 200/5 |
| 4,975,547 | 12/1990 | Nakayama et al. | 200/5 R |
| 5,128,500 | 7/1992 | Hirschfeld | 200/5 R |
| 5,237,851 | 8/1993 | Maier et al. | 73/1 |
| 5,243,156 | 9/1993 | Shirasaka | 200/5 R |
| 5,350,889 | 9/1994 | Lauritsen | 200/1 |
| 5,359,651 | 10/1994 | Draganoff | 379/354 |
| 5,369,230 | 11/1994 | Misawa | 200/52 |
| 5,436,954 | 7/1995 | Nishiyama et al. | 379/58 |
| 5,442,149 | 8/1995 | Sato | 200/5 R |
| 5,510,810 | 4/1996 | Nishijima et al. | 345/156 |
| 5,541,988 | 7/1996 | Draganoff | 379/354 |
| 5,608,196 | 3/1997 | Hall et al. | 200/61.19 |

FOREIGN PATENT DOCUMENTS 0 679 003 A2  10/1995  European Pat. Off. .
0 726 657 A1  8/1996   European Pat. Off. .

OTHER PUBLICATIONS

"KSS Miniature Side Actuated Tact Switch for SMT", ITT Canon Switch Product.

Primary Examiner—Michael L. Gellner
Assistant Examiner—Lee S. Lum
Attorney, Agent, or Firm—Brian Mancini

[57] ABSTRACT

A switch assembly (100) includes a first switch (102), a second switch (104) and a third switch (106). The switch assembly further includes a rocker actuator (108) having a first rocker arm (152) and a second rocker arm (154) and a selector actuator (110). The rocker actuator pivots about a post (158) to actuate the first switch or the second switch. The selector actuator is disposed between the first switch and the second switch to slidingly actuate the third switch. In one application, a radiotelephone (800, 904) includes a switch assembly (840). A controller (914) responds to actuations of the rocker actuator and the selector actuator to control storage of data in a memory (926) and display of data in the display (818, 918).

4 Claims, 4 Drawing Sheets

SWITCH ASSEMBLY INCLUDING ROCKER SWITCH WITH INTEGRATED CENTER SELECTOR SWITCH

FIELD OF THE INVENTION

The present invention generally relates to electrical switches. More particularly, the present invention relates to a switch assembly including a rocker switch and integrated center selector switch for use with a portable radiotelephone.

BACKGROUND OF THE INVENTION

Switch assemblies have been developed which combine multiple switches in a single assembly. The multiple switches are operated using differing mechanical actuation. Such switch assemblies combine multiple switch functionality in an integrated device.

One particular use for switch assemblies is in a portable radiotelephone such as a cellular telephone. A radiotelephone commonly includes a menu system for controlling the functioning of the radiotelephone. For example, an electronic phone book of names and associated phone numbers is stored in memory. Contents of a portion of the memory, including several entries from the phone book, are displayed on a display. A controller responds to signals from a switch assembly or group of switches to control what data is displayed in the display from the memory. The controller thus allows a user to scroll through the phone book, select a name or number and initiate a call. The user manipulates the switches to navigate through the menu and phone book.

Different types of switches have been used for this purpose. In one application, three discrete switches with individual actuators are provided for menu control. This solution is inexpensive, because the switches can be purchased individually. However, this solution is physically large because the three switches are placed in series. In modern consumer electronics, the emphasis is on reducing the size of products. Large discrete switches are inconsistent with this trend. Also, the large size places the switches too far apart to be readily used by the fingers of one hand.

In another application, a rotary-click switch has been developed for menu control. A rotary thumbwheel may be turned to move in different directions, such as up and down, through a menu. The rotary element may be depressed or an associated switch may be depressed to perform the select function, such as selecting a menu item or initiating a call. This switch may be easily used by operating the thumbwheel with a thumb while holding the radiotelephone in one hand. This switch assembly has substantial disadvantages, however. For example, such switches are generally custom designed and built as combinations of rotary elements, one or more switches and potentiometers. Also, such switches tend to be large and expensive to use. Manufacturers always seek to reduce size, weight and manufacturing costs.

Accordingly, there is a need in the art for a switch assembly which is inexpensive to manufacture, is very small in size but which is comfortable and easy to use in conjunction with a portable radiotelephone.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, and wherein:

DETAILED DESCRIPTION OF A PREFERRED EMBODIMENT

Figure 1:
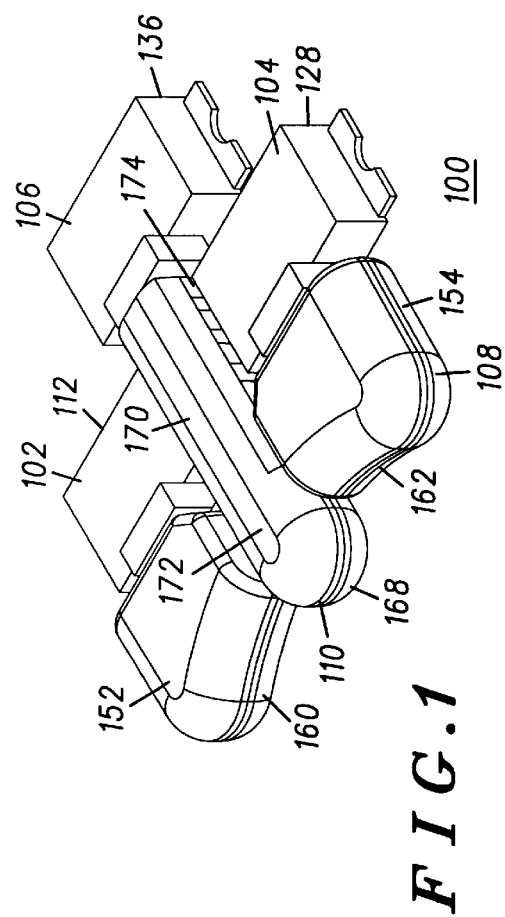
FIG. 1 is an isometric view of a first embodiment of a switch assembly in accordance with the present invention.
Figure 2:
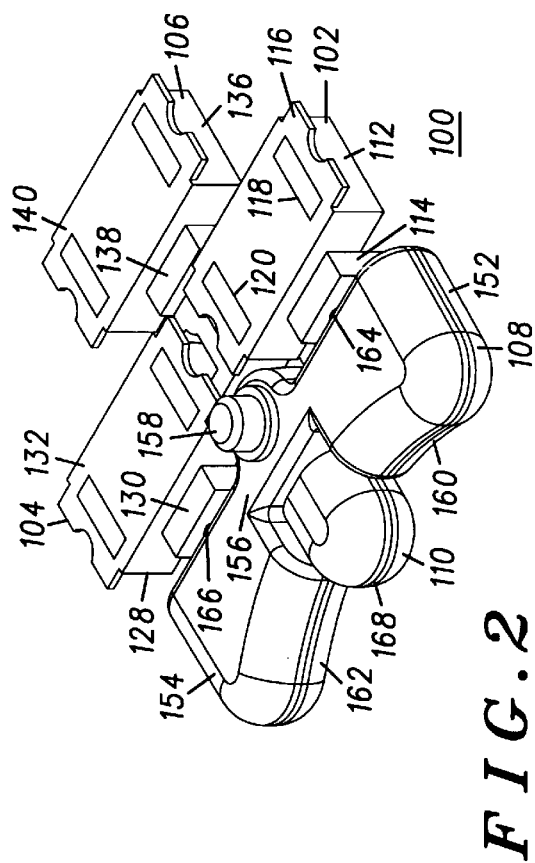
FIG. 2 is a reverse isometric view of the switch assembly of FIG. 1.
Figure 3:
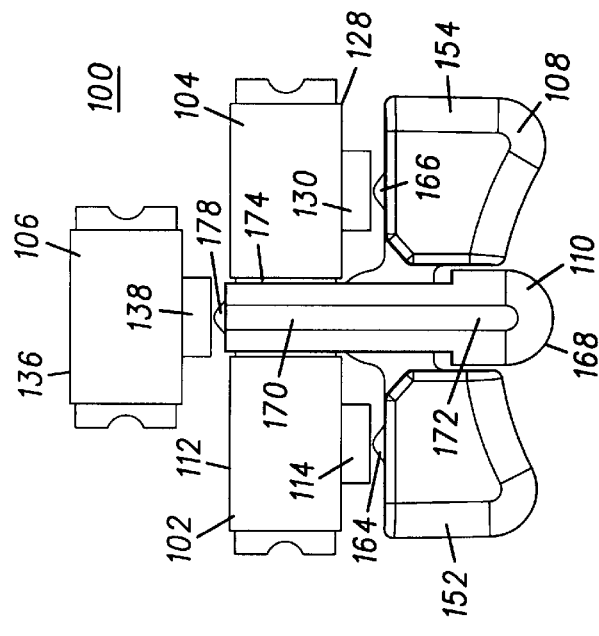
FIG. 3 is a top plan view of the switch assembly of FIG. 1.
Figure 4:
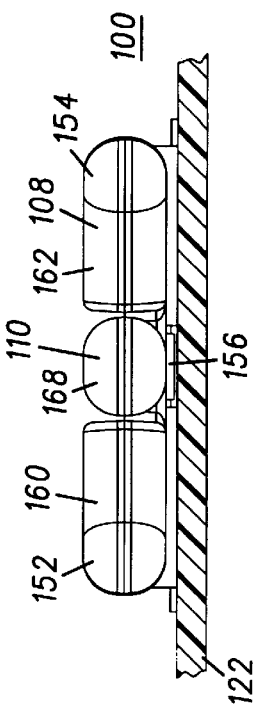
FIG. 4 is front view of the switch assembly of FIG. 1.

Referring now to FIG. 1, FIG. 2, FIG. 3 and FIG. 4, a switch assembly 100 includes a first switch 102, a second switch 104, a third switch 106, a rocker actuator 108 and a selector actuator 110. The first switch 102, the second switch 104 and the third switch 106 are preferably substantially identical single pole, single throw momentary switches. These switches are manually actuated by moving the rocker actuator 108 and the selector actuator 110.

The first switch 102 includes a body 112, first tactile actuator 114 and a mounting pad 116. The body 112 contains the switch components. The first tactile actuator 114 actuates the switch when the first tactile actuator 114 is depressed or otherwise translated. In the illustrated embodiment, depressing the first tactile actuator 114 momentarily closes the first switch 102, completing an electrical connection. The body includes a bias element such as a spring which biases the first tactile actuator 114 outward, to the normally open position. The first switch 102 may be of the normally closed type or any other suitable type of switch. The mounting pad 116 provides a convenient surface for surface mounting the first switch 102. The mounting pad thus includes an electrical contact area 118 and an electrical contact area 120 for electrically contacting a printed circuit board 122.

The second switch 104 includes a body 128, a second tactile actuator 130 and a mounting pad 132. The third switch 106 includes a body 136, a third tactile actuator 138 and a mounting pad 140. As noted, the switches in the illustrated embodiment are substantially identical and are standard, off the shelf components. A suitable off the shelf switch is the KSS miniature side actuated tact switch for SMT (surface mount technology), available from ITT Schadow, Inc., located in Eden Prairie, Minn. Other switches may be substituted. Use of off the shelf switches, rather than custom designed switches, reduces the cost of the switches of the switch assembly 100, thereby reducing the overall manufacturing cost of an electronic device, such as a radiotelephone, which includes the switch assembly 100.

To minimize the space required by the switch assembly 100, the three switches are staggered in their placement. The second switch 104 is disposed proximally adjacent the first switch 102. The third switch 106 is disposed behind the first switch 102 and the second switch 104. Here, behind the first switch 102 and the second switch 104 means that the body 112 of the first switch and the body 128 of the second switch 104 are located between the rocker actuator 108 and selector actuator 110 and the third switch 106. Any other suitable placement of the switches so that the three switches are not linearly disposed may be used. By staggering the switch placement in this manner, the height of the switch assembly 100 (right to left dimension in FIG. 4) is minimized. This permits reduction in size of any electronic device using the switch assembly 100 and permits the rocker actuator 108 and selector actuator 110 to be easily manipulated by a single finger or thumb of one hand of a user.

The rocker actuator 108 has a first rocker arm 152, a second rocker arm 154 and a center link 156 including a post 158. The rocker actuator 108 is disposed adjacent to the first switch 102 and the second switch 104 and is configured to pivotably actuate one of the first switch 102 and the second switch 104. To that end, the rocker actuator is pivotable about the post 158. The post 158 extends from the center link 156 and is configured for pivoting engagement with a support, such as a hole in the printed circuit board 122.

In the illustrated embodiment, the rocker actuator 108 includes a first finger surface 160 and a second finger surface 162. These finger surfaces are adapted for engagement by a finger or thumb of a user to actuate the rocker actuator 108. The rocker actuator 108 pivots about the post 158 from a neutral position, illustrated in FIG. 1–FIG. 4, to a first position in response to actuation of the first rocker arm 152 for engaging the first tactile actuator 114 of the first switch 102. The rocker actuator 108 pivots about the post 158 from the neutral position to a second position in response to actuation of the second rocker arm 154 for engaging the second tactile actuator 130 of the second switch 104.

The first rocker arm 152 includes a first engagement member 164 positioned to engage the first tactile actuator 114. The second rocker arm 154 includes a second engagement member 166 positioned to engage the second tactile actuator 130. The first engagement member 164 and the second engagement member 166 are any suitable size and shape. The size and shape of the engagement members is chosen based on the desired travel of the rocker arms from the neutral position to a position in which the tactile actuator is engaged and the desired tolerance of the relative positioning of the components of the switch assembly 100.

The selector actuator 110 includes a body 170 and an extension 172. The extension 172 terminates in a finger surface 168. The first switch 102 and the second switch 104 are spaced to define a notch 174 sized to receive the body 170 of the selector actuator 110. Similarly, the first rocker arm 152, the second rocker arm 154 and the center link 156 of the rocker actuator 108 define a slot 176 sized to receive the extension 172 of the selector actuator 110. The slot 176 aligns with the notch 174 for sliding actuation of the third switch 106 by engaging the finger surface 168 of the extension 172. Thus, the selector actuator 110 is actuated by depressing the finger surface 168. The selector actuator 110 slides in the notch 174 and the slot 176 and engages the third tactile actuator 138. As illustrated, the selector actuator includes a third engagement member 178 positioned to engage the third tactile actuator 138. The size and shape of the third engagement member 178 is selected using the same considerations described above for selecting the first engagement member 164 and second engagement member 166.

Since the finger surface 168 of the selector actuator 110 is located between the first finger surface 160 and the second finger surface 162 of the rocker actuator 108, the switch assembly 100 is particularly well suited to easy operation using only one finger or one thumb of a user's hand. While grasping an electronic device such as a radiotelephone in one hand, the rocker actuator 108 and the selector actuator 110 are spaced directly adjacent to each other, with no intervening space. The finger surfaces are thus also directly adjacent, allowing rapid, accurate selection and actuation of one of the switches. This improves user convenience, for example when maneuvering in a menu system or electronic phone book of a radiotelephone. This also reduces the overall size of the switch assembly 100.

Figure 5:
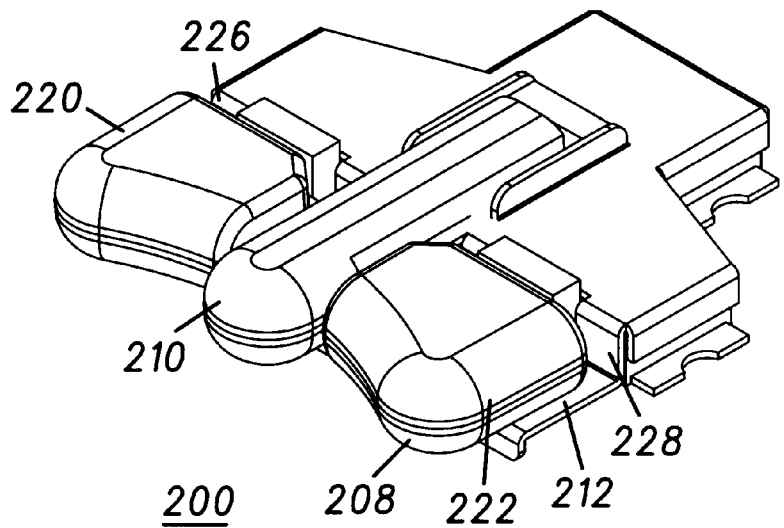
FIG. 5 is an isometric view of a second embodiment of a switch assembly in accordance with the present invention.
Figure 6:
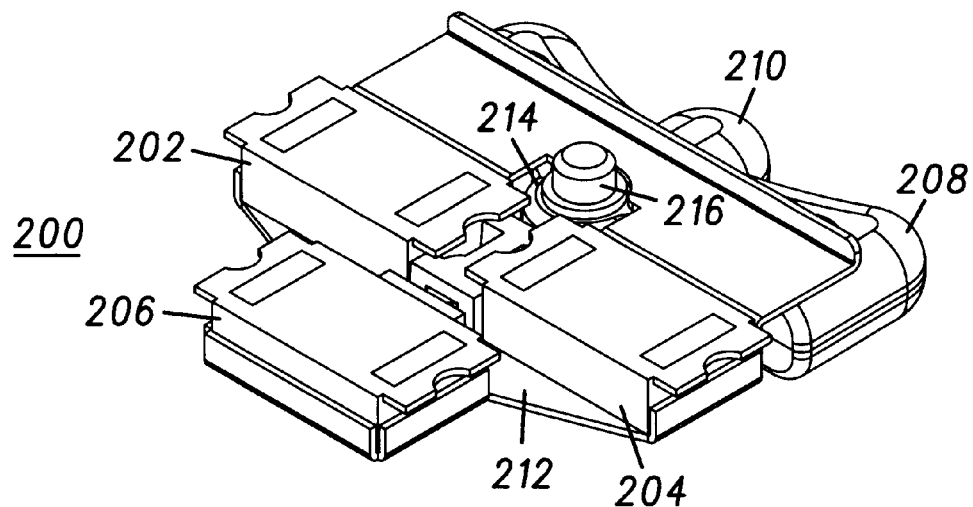
FIG. 6 is a reverse isometric view of the switch assembly of FIG. 5
Figure 7:
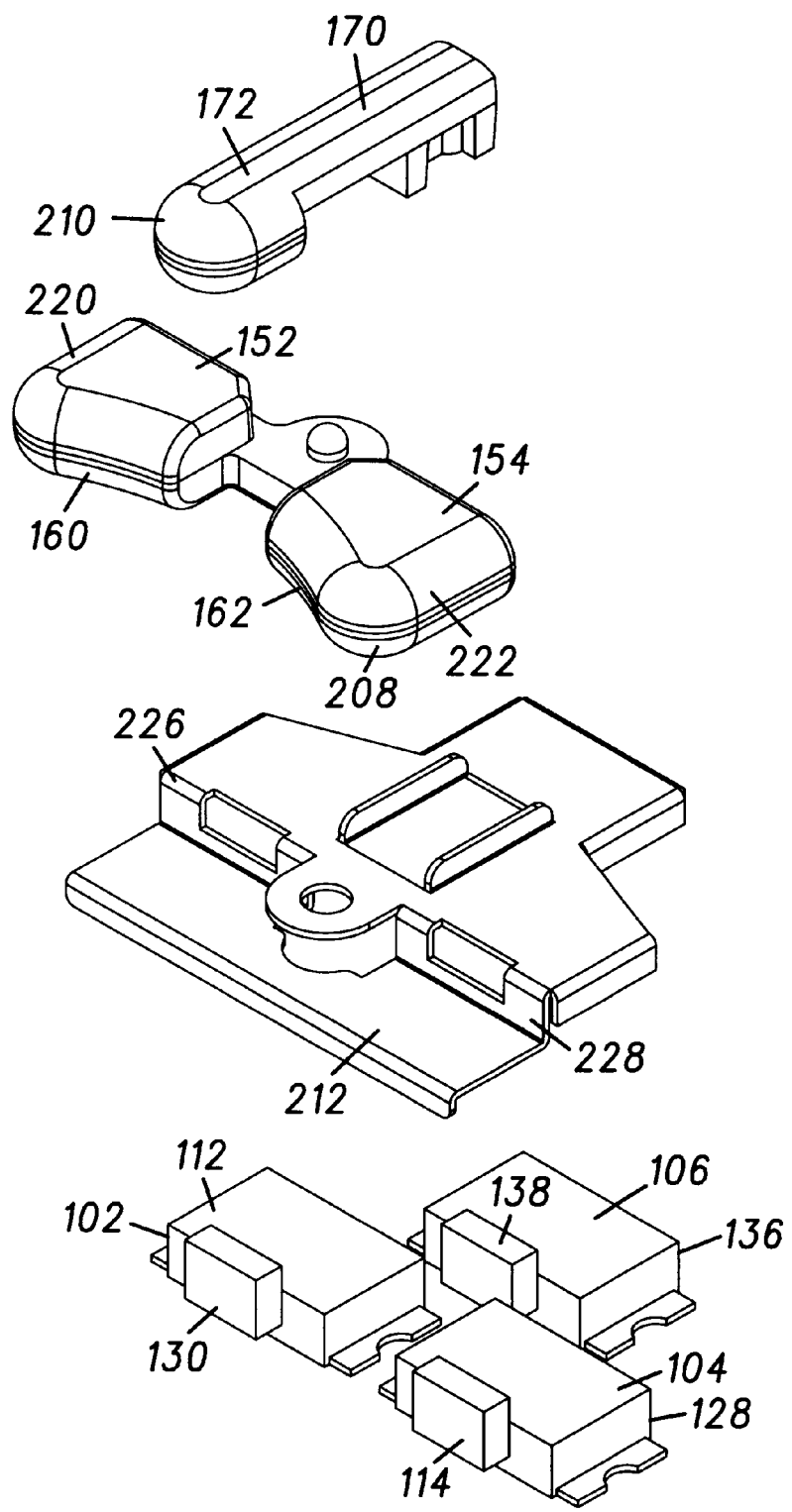
FIG. 7 is an exploded view of the switch assembly of FIG. 5.

Referring now to FIG. 5, FIG. 6 and FIG. 7, a switch assembly 200 in accordance with a second embodiment of the present invention is shown. The switch assembly 200 includes a first switch 202, a second switch 204 and a third switch 206. The switch assembly 200 further includes a rocker actuator 208 and a selector actuator 210. Construction and operation of these elements are generally the same as for the similar elements of FIG. 1 FIG. 4.

The switch assembly 200 still further includes a bracket 212 for retaining in fixed orientation the first switch 202, the second switch 204, the third switch 206, the rocker actuator 208 and the selector actuator 210. The bracket 212 retains the three tactile switches and the two actuators, allowing greater control over the tolerances of positioning the elements individually. This results in improved consistency of tactile feel when operating the switch assembly 200. By including the bracket 212, the total number of individual components which must be assembled to produce a completed electronic device is reduced from five (three switches and two actuators) in the embodiment of FIG. 1 to one in the embodiment of FIG. 5. This reduces manufacturing cost, waste and time. If assembly is by surface mount attachment to a printed wiring board (PWB), the entire switch assembly 200 may be directly attached to the PWB as one component. If robotic assembly is being used, the switch assembly may be placed by a robotic tool such as a vacuum tool.

The bracket 212 defines a hole 214 sized to receive a post 216 of the rocker actuator 208. The hole 214 partially or wholly surrounds the post 216 so that the rocker actuator 208 pivots about the post 216. In this manner, the first rocker arm 220 and the second rocker arm 222 of the rocker actuator 208 actuate the first switch 202 and the second switch 204, respectively. In the illustrated embodiment, the bracket 212 includes a first shoulder 226 and a second shoulder 228 disposed to limit the travel of the first rocker arm 220 and the second rocker arm 222, respectively. This prevents the rocker arms from damaging the switches if the rocker actuator 208 pressed too hard.

Figure 8:
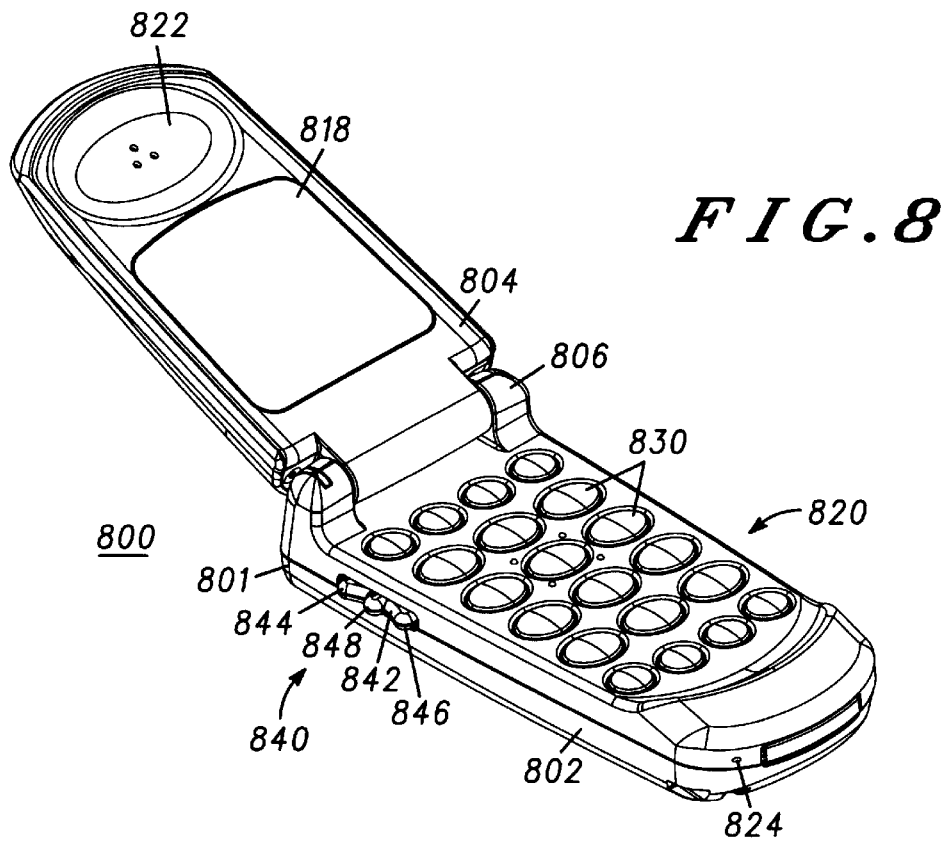
FIG. 8 is an isometric view of a radiotelephone including a switch assembly in accordance with the present invention.

FIG. 8 is an illustration of a radiotelephone 800 with which the switch assembly in accordance with the present invention may be used. The radiotelephone includes a housing 801 including a first housing 802 and a second housing 804 and a hinge 806. The radiotelephone may be moved between an open position shown in FIG. 8 and a closed position by folding the housings about the hinge. Control circuitry is contained in the first housing 802 and the second housing 804.

The first housing 802 includes a keypad 820 including keys 830 and a switch assembly 840. The switch assembly 840 includes a rocker actuator 842 having a first rocker arm 844 and a second rocker arm 846 and a selector actuator 848. The switch assembly is similar to the switch assembly 100 or the switch assembly 200 described above in connection with FIG. 1 and FIG. 2. The second housing 804 includes a display 818 disposed within the housing and a speaker 822.

Figure 9:
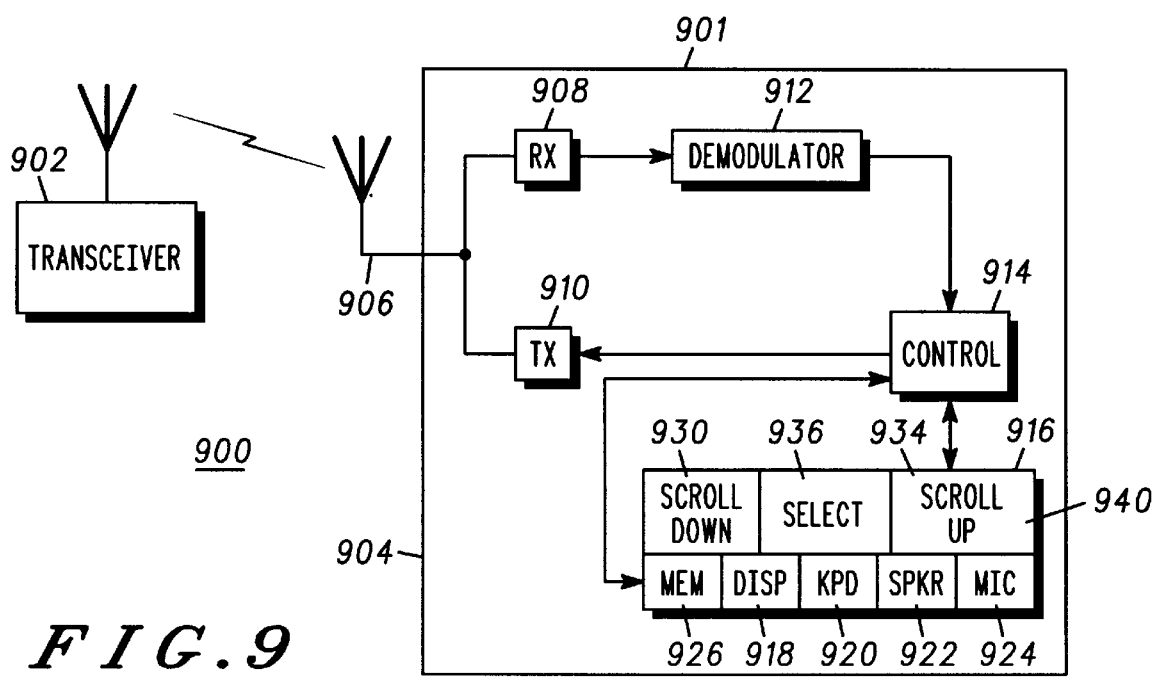
FIG. 9 is an operational block diagram of the radiotelephone of FIG. 8.

Referring now to FIG. 9, it is an illustration in block diagram form of a radiotelephone communication system 900. The radiotelephone communication system 900 includes a remote transceiver 902 and one or more radiotelephones such as radiotelephone 904. The remote transceiver 902 sends and receives radio frequency (RF) signals to and from radiotelephones within a fixed geographic area.

The radiotelephone 904 is one such radiotelephone contained within the geographic area, and may be of the type illustrated in FIG. 8. The radiotelephone 904 includes an antenna 906, a receiver 908, a transmitter 910, a demodulator 912, a controller 914 and a user interface 916, all contained in a housing 901. Upon reception of RF signals, the radiotelephone 904 detects the RF signals through the antenna 906 producing detected RF signals. The receiver 908, coupled to the antenna 906, converts the detected RF signals into electrical baseband signals. The demodulator 912 demodulates the electrical baseband signals and recovers the data transmitted on the RF signals and outputs the data to the controller 914. The controller 914 is disposed within the housing 901 for controlling the radiotelephone 904 including a display 918. The controller 914 formats the data into recognizable voice or information for use by user interface 916. The user interface 916 communicates the received information or voice to a user. Typically, the user interface 916 includes the display 918, a keypad 920, a speaker 922, a microphone 924 and a switch assembly 940. The radiotelephone further includes a memory 926.

Upon transmission of radio frequency signals from the radiotelephone handset 904 to the remote transceiver 902, the user interface 916 transmits user input data to the controller 914. The controller 914 typically includes a microprocessor, memory, clock generator and a power amplifier control circuit. The controller 914 formats the information obtained from the user interface 916 and conveys it to the transmitter 910 for conversion into RF modulated signals. The transmitter 910 conveys the RF modulated signals to the antenna 906 for transmission to the remote transceiver 902.

Preferably, the switch assembly 940 is of the type described above in connection with FIG. 1, FIG. 5 and FIG. 8. The switch assembly 940 includes a scroll down button 930, a scroll up button 934 and a select button 936. These buttons correspond to the rocker actuator having a first rocker arm and a second rocker arm and a select actuator, as described above. These buttons actuate a first switch, a second switch and a third switch to send appropriate electrical signals to the controller 914. These buttons, when used in conjunction with the controller 914, provide the described movement through a menu system or electronic phone book stored in the memory 926.

The memory 926 is disposed within the housing 901 for storing and retrieving data. In particular, the memory is used for storing information forming a telephone book and for storing a menu system. The stored electronic phone book data include data representing names and associated telephone numbers and possible other information as well. The data are entered using the keypad 920. The data are displayed on the display 918, both during entry and during subsequent use of the phone book. The memory 926 may be searched for previously stored data by entering search elements or symbols from the keypad 920.

In accordance with the present invention, the controller 914 responds to the actuations of the rocker actuator and the selector actuator to control storage of data in the memory 926 and display of data in the display 918. The controller is typically a microprocessor or microcontroller which operates responsive to stored program instructions or software. The switch actuations are interpreted in accordance with definitions maintained in the software and may be customized to particular applications, such as a menu system or electronic phone book.

As can be seen from the foregoing, the present invention provides a switch assembly which is inexpensive to manufacture and is very small in size but which is comfortable and easy to use in conjunction with a portable radiotelephone. Use of off the shelf components and one-piece rocker actuator and selector actuator reduces the cost of materials. The switch assembly components may be assembled directly to a surface such as a PWB or combined in a one-piece assembly held together by a bracket or other device. Staggering the placement of the three switches reduces the size of the completed assembly. This in turn reduces the volume required for installing the switch in an assembled electronic device. For use with an electronic device such as a radiotelephone, staggering the three switches permits the rocker arms and selector actuator to be placed in close proximity, permitting easy one-thumb operation.

While a particular embodiment of the present invention has been shown and described, modifications may be made. For example, the relative placement of the three switches in the switch assembly may be varied. It is therefore intended in the appended claims to cover all such changes and modifications which fall within the true spirit and scope of the invention.

What is claimed is:

1. A switch assembly comprising:
   a first switch, a second switch and a third switch, the third switch disposed behind the first switch and the second switch;
   a one-piece rocker actuator disposed adjacent to the first switch and the second switch and configured to pivotably actuate one of the first switch and the second switch;
   a one-piece selector actuator disposed between the first switch and the second switch and configured to slidingly actuate the third switch;
   wherein the selector actuator includes a body and an extension and wherein the first switch and the second switch are spaced to define a notch sized to receive the body of the selector actuator; and
   wherein the rocker actuator includes a first rocker arm, a second rocker arm and a center link, the first rocker arm, the second rocker arm and the center link defining a slot sized to receive the extension of the selector actuator, the slot aligning with the notch for sliding the selector actuator to actuate the third switch when the extension is engaged.

2. A switch assembly as recited in claim 1 wherein the rocker actuator further comprises a post extending from the center link, the rocker actuator pivoting about the post to actuate one of the first switch and the second switch.

3. A switch assembly comprising:

a first switch having a first switch tactile actuator oriented in a predetermined direction;

a second switch disposed proximally adjacent the first switch and having a second switch tactile actuator oriented in the predetermined direction;

a one-piece rocker actuator having a first rocker arm, a second rocker arm, a center link, and a post extending from the center link, the rocker actuator pivotable about the post from a neutral position to a first position in response to actuation of the first rocker arm for engaging the first switch tactile actuator and from the neutral position to a second position in response to actuation of the second rocker arm for en aging the second switch tactile actuator;

a third switch disposed behind the first switch and the second switch and having a third switch tactile actuator;

a one-piece selector actuator having an extension and a body, the extension disposed between the first rocker arm and the second rocker arm, the selector actuator slidable to actuate the third switch tactile actuator; and wherein the rocker actuator further includes the center link joining the first rocker arm and the second rocker arm so that the center link, the first rocker arm and the second rocker arm define a slot sized to receive the extension of the selector actuator.

4. A switch assembly as recited in claim 1 wherein the rocker actuator further comprises a post extending from the center link and configured for pivoting engagement with a support formed by a hole in a circuit board, the rocker actuator pivoting about the post to actuate one of the first switch and the second switch.

* * * * *

UNITED STATES PATENT AND TRADEMARK OFFICE
CERTIFICATE OF CORRECTION

PATENT NO. : 5,923,007
DATED : July 13, 1999
INVENTOR(S) : Emmert

It is certified that error appears in the above-identified patent and that said Letters Patent is hereby corrected as shown below:

<u>Claim 3</u>

In line 14, please replace "en aging" with --engaging--.

Signed and Sealed this

Twenty-ninth Day of February, 2000

Attest:

Q. TODD DICKINSON

*Attesting Officer*      *Commissioner of Patents and Trademarks*